March 25, 1930.　　N. VON KORSHENEWSKY　　1,751,961
ALTERNATING CURRENT SYSTEM

Filed Sept. 10, 1923

Inventor
NICOLAI VON KORSHENEWSKY
By his Attorney
Ira J. Adams

Patented Mar. 25, 1930

1,751,961

UNITED STATES PATENT OFFICE

NICOLAI von KORSHENEWSKY, OF BERLIN, GERMANY, ASSIGNOR TO GESELLSCHAFT FÜR DRAHTLOSE TELEGRAPHIE M. B. H., OF BERLIN, GERMANY, A CORPORATION OF GERMANY

ALTERNATING-CURRENT SYSTEM

Application filed September 10, 1923, Serial No. 661,821, and in Germany October 13, 1922.

Alternating current systems often comprise resonant circuits containing capacitive and inductive reactances connected in series or in parallel. These circuits are employed to constitute respectively short-circuits for their resonance frequency and trap-circuits having infinite impedance for their resonance frequency. In order to function perfectly as a short-circuit of no impedance or a trap circuit of infinite impedance, the resonant circuit would have to generate two currents or voltages 180° different in phase.

Heretofore this aim could never be fully attained because of the ohmic resistances of the circuits. Furthermore, whenever it was necessary for any reason to use large coils, the influence of the damping became especially great.

According to the invention, an auxiliary circuit is coupled, on the one hand, to an alternating current system at a suitably chosen point and, on the other hand, to the parallel resonant circuit or series resonant circuit. By this arrangement an additional voltage can be impressed upon these last-mentioned circuits. By suitably selecting the constants of the auxiliary circuit and of the coefficients of coupling between it and the alternating current system and the resonant circuit, an additional voltage can be caused to compensate accurately the ohmic voltage-drop in the resonant circuit.

Figure 4:
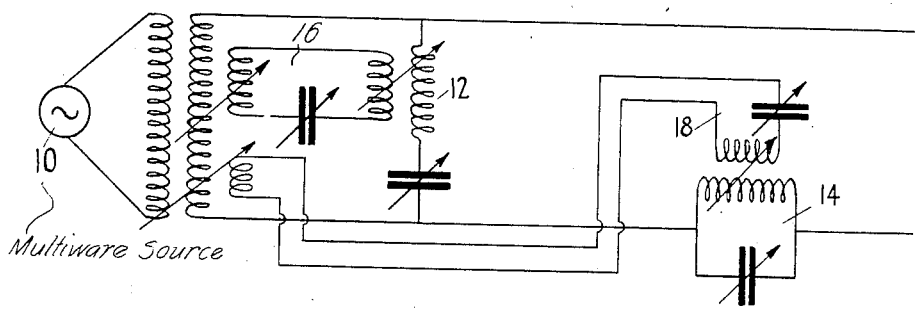
Fig. 4 is a diagrammatic representation of an alternating current system embodying the invention.

The alternating-current system shown in Fig. 4 comprises a generator 10 of multi-wave current, that is, current of different frequencies; a series resonant circuit 12 tuned to one of said frequencies; and a parallel resonant circuit 14 tuned to another of said frequencies and inserted in the generator circuit.

The additional voltage for compensating the ohmic resistance in the series resonant circuit 12 may be obtained from a circuit 16 coupled to the series resonant circuit 12 and also to a suitable point in the generator circuit. The additional voltage for compensating the ohmic resistance of the trap circuit 14 may, in like manner, be impressed upon the circuit 14 by a circuit 18 coupled to the trap-circuit and to the generator circuit. As hereinbefore described, the constants of the compensating circuits 16 and 18 and the couplings between the circuits 16 and 18 and the generator and resonant circuits respectively, are so selected as to cause the circuits 16 and 18 to impress upon the series resonant circuit 12 and the parallel resonant circuit 14 voltages such as to compensate accurately the ohmic resistances of the circuits 12 and 14.

Figure 1:
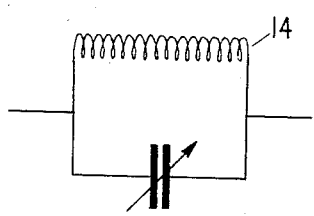
Fig. 1 shows a resonant circuit, commonly called a trap-circuit, containing inductive and capacitive reactances in parallel and designed to act as an infinite impedance to currents of the frequency for which the circuit is tuned.
Figure 2:
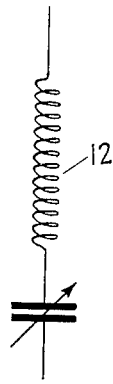
Fig. 2 shows a circuit comprising inductive and capacitive reactances in series and designed to act as a short-circuit for current of the resonant frequency.
Figure 3:
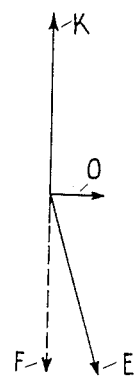
Fig. 3 is a vector diagram showing the proportions and phase relations of the currents and voltages in circuits such as are shown in Figs. 1 and 2.

If a series resonant circuit were without ohmic resistance, the voltages in the circuit would be as represented by vectors K and F of equal length and extending in opposite directions, that is, at an angle of 180° to each other, as indicated in Fig. 3 of the drawing. By reason, however, of the ohmic resistance of the circuit, which causes a voltage-drop represented in Fig. 3 by the vector O, the voltage F is caused to deviate from an angle of 180° with the vector K and may be represented by the vector E. The same description of Figure 3 applies to a parallel resonant circuit provided current is substituted for voltage. The effect of the compensating circuit 16 or 18 is to set up a voltage or current respectively which is precisely equal to but in opposition with the voltage-drop or current represented by the vector O, thereby causing the voltages or currents of the circuits 12 and 14 respectively to be as represented by the vectors K and F.

This invention enables two currents or voltages to be adjusted accurately to 180° difference in phase and thereby enables a parallel resonant circuit to function perfectly as an infinite impedance. It also enables a circuit comprising inductive and capacitive reactances arranged in series to act as a perfect short-circuit for the frequency to which it is resonant.

Having described my invention, what I claim is:

1. An alternating current system comprising a source of alternating electrical energy, a resonant circuit connected to said source for the purpose of carrying energy from said source, and an auxiliary circuit independently coupled, on the one hand, to said source and on the other hand, to the resonant circuit, for compensating the voltage-drop caused by the ohmic resistance of the resonant circuit.

2. An alternating current system comprising a generator of alternating current energy of different frequencies, a series resonant circuit tuned to one of the frequencies produced by the generator, a parallel resonant circuit tuned to another of the frequencies produced by the generator, and auxiliary circuits coupled to the alternating current system and to the series resonant circuit and parallel resonant circuit for compensating in said last-mentioned circuits the voltage-drop caused by the ohmic resistances of the circuits.

3. An alternating current system comprising an alternating current generator, a parallel resonant circuit tuned to the frequency of energy produced by the generator and an auxiliary circuit for impressing voltage on the parallel resonant circuit to compensate for the voltage-drop caused by the ohmic resistance of the parallel resonant circuit.

4. An alternating current system comprising an alternating current generator, a parallel resonant circuit arranged in the generator circuit and tuned to the frequency of energy produced by the generator and an auxiliary circuit coupled to the parallel resonant circuit and the generator circuit and having such constants and coefficients of coupling with the parallel resonant circuit and generator circuit, respectively, as to cause it to impress upon the parallel resonant circuit voltage which accurately compensates for the voltage-drop in the parallel resonant circuit caused by the ohmic resistance of the circuit.

5. In combination, a source of alternating voltage, a tuned circuit fed by said source only, said circuit having resistance, capacitive reactance and inductive reactance, means to connect said source and said circuit, and means other than the connecting means for compensating the effect of the resistance in said circuit by applying voltage to said circuit from said source.

6. In combination, a source of alternating voltage, a tuned circuit fed by said source only, said circuit having capacitive reactance and inductive reactance connected in series, resistance associated with said tuned circuit, means to connect said source and said circuit, and a compensating circuit coupled to said source and to said tuned circuit for compensating the effect of the resistance of said tuned circuit.

7. In combination, a source of alternating voltage, a tuned circuit fed by said source only, said circuit having resistance, capacitive reactance and inductive reactance, a compensating circuit for compensating the effect of the resistance on said tuned circuit, said compensating circuit having a variable reactance and variable couplings with said source and said tuned circuit.

8. An alternating current system comprising a source of alternating voltage at a plurality of frequencies, a series resonant circuit comprising an inductance and a capacitance in series tuned to one of said frequencies and connected to said source, and a compensating circuit containing a capacitance and inductances coupled to the source and to the inductance of the series resonant circuit for compensating for the resistance of the series resonant circuit.

9. An alternating current system comprising a generator of alternating current energy of different frequencies, a series resonant circuit tuned to one of the frequencies produced by the generator, a parallel resonant circuit tuned to one of the frequencies produced by the generator, and auxiliary circuits coupled to the alternating current system and to the series resonant circuit and parallel resonant circuit for compensating in said last mentioned circuits the voltage drop caused by the ohmic resistances of the circuits.

NICOLAI von KORSHENEWSKY.